(12) United States Patent
Kluge

(10) Patent No.: US 9,051,000 B2
(45) Date of Patent: Jun. 9, 2015

(54) METHOD FOR CONTROLLING A POWER-ASSISTED STEERING APPARATUS

(71) Applicant: Ford Global Technologies, LLC, Dearborn, MI (US)

(72) Inventor: Torsten Kluge, Overath (DE)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 14/062,809

(22) Filed: Oct. 24, 2013

(65) Prior Publication Data

US 2014/0121905 A1    May 1, 2014

(30) Foreign Application Priority Data

Oct. 25, 2012    (DE) .......................... 10 2012 219 539

(51) Int. Cl.
*B62D 5/00*    (2006.01)
*B62D 6/00*    (2006.01)

(52) U.S. Cl.
CPC ...................................... *B62D 6/008* (2013.01)

(58) Field of Classification Search
USPC .......... 701/41–42, 44; 180/6.2, 252, 400, 446
See application file for complete search history.

(56) References Cited

U.S. PATENT DOCUMENTS 5,578,767 A * 11/1996 Chikaraishi et al. ..... 73/862.331
5,842,754 A * 12/1998 Sano .............................. 303/147
5,944,137 A * 8/1999 Moser et al. .................. 180/446
6,354,156 B1 * 3/2002 Porth et al. ................. 73/862.08
2009/0211376 A1 * 8/2009 Landrieve ................ 73/862.333
2010/0006366 A1 * 1/2010 Doray ........................... 180/422
2011/0144865 A1 * 6/2011 Niemz ............................. 701/42

FOREIGN PATENT DOCUMENTS

| DE | 4017429 A1 | 12/1990 |
|---|---|---|
| DE | 102004006387 A1 | 8/2004 |
| EP | 1431160 A1 | 6/2004 |
| EP | 2397390 A1 | 12/2011 |
| GB | 2496299 A | 5/2013 |

\* cited by examiner

*Primary Examiner* — Yonel Beaulieu
(74) *Attorney, Agent, or Firm* — Burgess Law Office, PLLC; Raymond L. Coppiellie

(57) ABSTRACT

A method and apparatus for controlling an electrically power-assisted steering device for vehicles including a control unit providing control information to a steering device. The method and apparatus includes a setpoint signal value transmitter providing setpoint value information and obtaining actual value information from the steering device. The actual value information is fed to the setpoint signal value transmitter and a difference value information is obtained from the setpoint value information and actual value information with the difference value information fed to the control unit. A filter unit filters information components from one of the actual value information provided, the actual value information fed to the setpoint signal value transmitter, the setpoint value information or the difference value information.

14 Claims, 2 Drawing Sheets

METHOD FOR CONTROLLING A POWER-ASSISTED STEERING APPARATUS

CROSS-REFERENCE TO RELATED APPLICATIONS

Not Applicable.

BACKGROUND OF THE INVENTION

1. Field of the Invention

The present invention relates generally to a method for controlling an electrically power-assisted steering apparatus for vehicles; and more particularly, an apparatus for controlling an electrically power-assisted steering device for vehicles including a filter.

2. Description of Related Art

Electrically power-assisted steering devices, also referred to as an EPAS (Electric Power Assisted Steering) system, provide a power steering force. With an EPAS system an electric motor either applies a rotational force to a steering shaft connected to a steering pinion of a rack-and-pinion steering gear mechanism or applies a linear force to the steering rack. In such systems, the electric motor is usually controlled at least as a function of an input torque applied to a steering wheel by a driver of the vehicle, and a vehicle speed which is determined.

Two methods of applying rotational force are known, one determines the power steering force to be applied by the electric motor using a static boosting curve, also referred to as a static boost curve. The static boosting curve defines a static relationship between the input torque applied by the driver and the power steering force or assisting torque generated by the electric motor. The boosting curve can be a function that can be calculated or a characteristic curve diagram that is stored in advance, the function and diagram both include the driver input torque and vehicle speed as input variables. An advantage of using a static boosting curve is the ease of adjustment of the boosting curve. However, a disadvantage is that it does not take into account the dynamic behavior of the steering device since the control itself is static and cannot act dynamically.

Another method for uses a boosting curve including a dynamically regulated EPAS system. The electrically power-assisted steering device is regulated using an active, dynamic control unit, for example by means of a PID control unit, wherein the control unit is setpoint-value-controlled and the control device usually includes a setpoint signal value transmitter.

An active, dynamic control of a power steering force is known, for example, from EP1431160B1 that describes an electrically power-assisted steering device of a vehicle to which a power steering force or a steering assistance torque is applied by means of a motor. In particular, a system for controlling the steering properties experienced by the driver and the absolute value of the adverse effects from the road transmitted to the driver, in which the steering properties are determined and controlled independently of the control of the transmission of the adverse effects of the road. The system includes a setpoint signal value transmitter for calculating a setpoint steering wheel torque which is to be felt by the driver of the vehicle, as well as a first control unit and a second control unit which acts in parallel with the first control unit. The first control unit controls, through cooperation with the second control unit, a motor control unit which in turn controls the motor. The second control unit damps undesired adverse effects from the road, with the result that said adverse effects are not transmitted to the driver.

Although the dynamic control has significant advantages over the static control by means of a boosting curve, the currently known dynamically controlled EPAS systems are also defined by relatively poor feedback about the primary driving state of the vehicle, for example steering torques, resulting from the caster of the steered vehicle wheels or the transverse acceleration of the vehicle, to the driver by means of the steering device since the information which is transmitted to the steering device by the vehicle chassis is generally interpreted as being noise by the control device and/or compensated. This causes the steering sensation of active, dynamically controlled EPAS systems to be frequently perceived by drivers as being synthetic.

An improvement in this regard is performed by a dynamic control of an electrically power-assisted steering device of a vehicle which is disclosed in EP 2 397 390 A1. As set forth therein, a setpoint signal value transmitter feeds a setpoint value to a control unit of the steering device including a forward model or structural mapping of the steering device with a plurality of individual elements such that the structural mapping can be described by means of easily comprehensible parameters such as, for example, friction, rigidity, damping or absolute value of the feedback of road properties, and in this way the behavior of the real steering device can be adapted to the behavior of the structural mapping.

The present invention has as one object specifying a method for controlling an electrically power-assisted steering device for vehicles, in particular motor vehicles, and a device for controlling an electrically power-assisted steering device for vehicles, with the method and device providing a driver with an improved steering sensation which is, in particular, more realistic in terms of the feedback about the primary driving state of the vehicle. The primary driving state of the vehicle is to be understood as being, in particular, the information transmitted by the chassis of the vehicle to the steering device, for example the driving properties of the vehicle which result from the caster of the steered vehicle wheels or the transverse acceleration of the vehicle and which are intended to communicate the desired driving or steering sensation to the driver. In addition, this object is to be achieved in the simplest way possible.

SUMMARY OF THE INVENTION

Accordingly, one aspect of the present invention includes a method for controlling an electrically power-assisted steering device for vehicles, in particular motor vehicles. The method includes providing an active, dynamic control unit and using the unit to obtain control information and feeding the control information to the steering device. Using a setpoint signal value transmitter to make available setpoint value information and using the steering device to make available actual value information. Feeding in the actual value information to the setpoint signal value transmitter and forming difference value information from the setpoint value information and the actual value information. Feeding in the difference value information to the control unit and filtering out information components, determined by means of at least one filter unit, from the actual value information which is made available and/or fed in to the setpoint signal value transmitter and/or the setpoint value information and/or the difference value information.

The above "and/or" combination of the actual value information which is made available, the actual value information which is fed into the setpoint signal value transmitter, the setpoint value information and the difference value information is to be configured according to the present invention such that the method can be implemented either solely with any feature or with any possible combination of the features with one another.

The significant advantage of the method according to the invention is to be considered the fact that the information components which are filtered out by the filter unit can be selectively kept from the setpoint signal value transmitter and/or the control unit. In this way, for example by filtering out the desired type and quantity of information components only from the actual value information fed into the setpoint signal value transmitter, by means of the filter unit, for example by determining specific frequency ranges and amplitude ranges, it is therefore possible to prevent these information components from being passed on to the setpoint signal value transmitter, as a result of which they are ultimately also not included in the setpoint value information.

During the formation of difference values from the setpoint value information and the actual value information made available by the steering device, which also includes all the original information components, the difference value information continues to contain precisely those information components which were gated out from the setpoint value information. The information components which are the same both in the setpoint value information and in the actual value information made available are deleted from the difference value information by the formation of difference values. Consequently, the active, dynamic control unit does not receive any information about the information components that have been gated out from the difference value information, with the result that these components cannot be compensated by the control unit or interpreted by the latter as noise. What the control unit does not compensate can be perceived by the driver via the steering device in the way and quantity which are desired and can be determined by the filter unit. The driver therefore receives, despite the use of an active, dynamic control unit for controlling the electrically power-assisted steering device, realistic feedback about the primary driving state of the vehicle, as a result of which the steering sensation which is perceived by the driver is significantly improved.

Similar results according to the present invention can also be implemented if the sequence of the filter unit and the setpoint signal value transmitter is interchanged, that is to say if the setpoint value information which is made available by the setpoint signal value transmitter is filtered in the way described above by means of the filter unit, instead of or in addition to the actual value information which is fed into the setpoint signal value transmitter.

In order to keep the information components gated out by the filter unit away from the control device directly, that is to say not by means of the formation of difference values, it is possible, according to the present invention, to filter the difference value information or the actual value information made available by the steering device, instead of or in addition to the actual value information and/or the setpoint value information which is fed into the setpoint signal value transmitter, by means of the filter unit.

Generally, by means of the invention the desired feedback can be evaluated at least by retention by means of the filter unit. However, if necessary said feedback can even be boosted. For example, electrically power-assisted steering devices already have, due to mass inertia, a definite low-pass behavior in purely mechanical terms and also friction. This can also be compensated with the present invention.

According to one example of the invention, the information to be filtered by the filter unit may include one steering angle information item, one steering angle speed information item and/or one steering angle acceleration information item of the steering device. The steering angle can in this context expediently be detected by means of a suitable steering angle sensor on the steering device. The steering angle speed and the steering angle acceleration can subsequently be determined, for example, on the basis of the identified steering angle by calculation of the first or second derivative over time.

In addition, the setpoint value information which is used to form the difference value information and actual value information which is made available by the steering device includes at least one setpoint torque information item of a steering column of the steering device and an actual torque information item of the steering column, wherein the latter can be detected, for example, by a torque sensor on the steering column. As a result, the difference value information fed into the control unit constitutes a deviation of at least the actual torque from the setpoint torque. From this deviation, the control unit generates control information for an electric motor which provides power assistance for the steering device, for example a control signal for the assistance torque which is to be output by the electric motor.

A further example of the invention provides that the information is filtered by the filter unit by a Butterworth filter, in particular a Butterworth low-pass filter. As a result, relatively high frequency components of the actual value information, such as typically originate, for example, from adverse effects from the road, can be reliably and easily filtered out from, for example, the actual value information which is fed into the setpoint signal value transmitter. According to the present invention, any influence which is applied to the steering device of the vehicle by a roadway surface on which the vehicle is travelling, and which is therefore input into the actual value information of the steering device by the steering device, can be understood as adverse effects from the road.

In order to ensure optimum adaptation of the filter parameters to a specific information item which is to be filtered, according to a further example includes a separate filter unit used for, in each case, each information item to be filtered, for example the steering angle information and/or the steering angle speed information and/or the steering angle acceleration information.

For dynamic control of the steering device, a further example includes the control information is a PID (Proportional-Integral-Differential) control unit.

An additional embodiment of the invention including an apparatus for controlling an electrically power-assisted steering device for vehicles, in particular for motor vehicles. The apparatus including in active, dynamic control unit for making available control information and a setpoint signal value transmitter for making available setpoint value information. The control unit receives difference value information from the setpoint value information and actual value information made available by the steering device. The setpoint signal value transmitter receives the actual value information made available by the steering device. In addition, a filter unit filters out predetermined information components from the actual value information made available and/or the actual value information received by the setpoint signal value transmitter and/or the setpoint value information and/or the difference value information.

The type and quantity of the information components filtered out from the information can be selectively set to specific frequencies and/or amplitude ranges by, for example, the parameterization of the filter unit. The information components are filtered out from, for example, the actual value information received from the setpoint signal value transmitter and are not passed on to the setpoint signal value transmitter. As a result they are ultimately not included in the setpoint value information. During the formation of difference values from the setpoint value information and the actual value information, made available by the steering device and including all the original information components, the difference value information continues to contain precisely those information components that were gated out from the setpoint value information. The information components are the same both in the setpoint value information and in the actual value information made available are deleted from the difference value information by the formation of difference values.

Consequently, the active, dynamic control unit does not receive any information about the information components gated out from the difference value information, with the result that these components cannot be compensated by the control unit or interpreted by the latter as noise. What is not compensated by the control unit can be perceived by the driver, via the steering device, in a way and quantity which are desired and can be determined by the filter unit. Despite the use of an active, dynamic control unit for controlling the electrically power-assisted steering device, the driver accordingly receives realistic feedback about the primary driving state of the vehicle, as a result of which the steering sensation perceived by the driver is significantly improved.

Similar results according to the present invention can also be implemented if the sequence of the filter unit and of the setpoint signal value transmitter is interchanged; for example if the setpoint value information made available by the setpoint signal value transmitter is filtered in the way described above by means of the filter unit, instead of or in addition to the actual value information received by the setpoint signal value transmitter.

In order to keep the information components gated out by the filter unit away from the control device directly, it is possible, according to the present invention, to filter the difference value information or the actual value information made available by the steering device, instead of or in addition to the actual value information received by the setpoint signal value transmitter or the setpoint value information, by means of the filter unit.

According to one example the information filtered by the filter unit includes at least one item including, but not limited to, steering angle information, steering angle speed information or steering angle acceleration information.

A further example is that the filter unit includes a Butterworth filter; in particular, a Butterworth low-pass filter, that filters out the relatively high frequency components which are contained in the information. It is possible for a separate filter unit to be provided in each case for filtering out each information item which is to be filtered, as a result of which the adaptation of the filter unit to the information which is to be specifically filtered out is improved.

According to a further example the control unit is a PID (Proportional-Integral-Differential) control unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
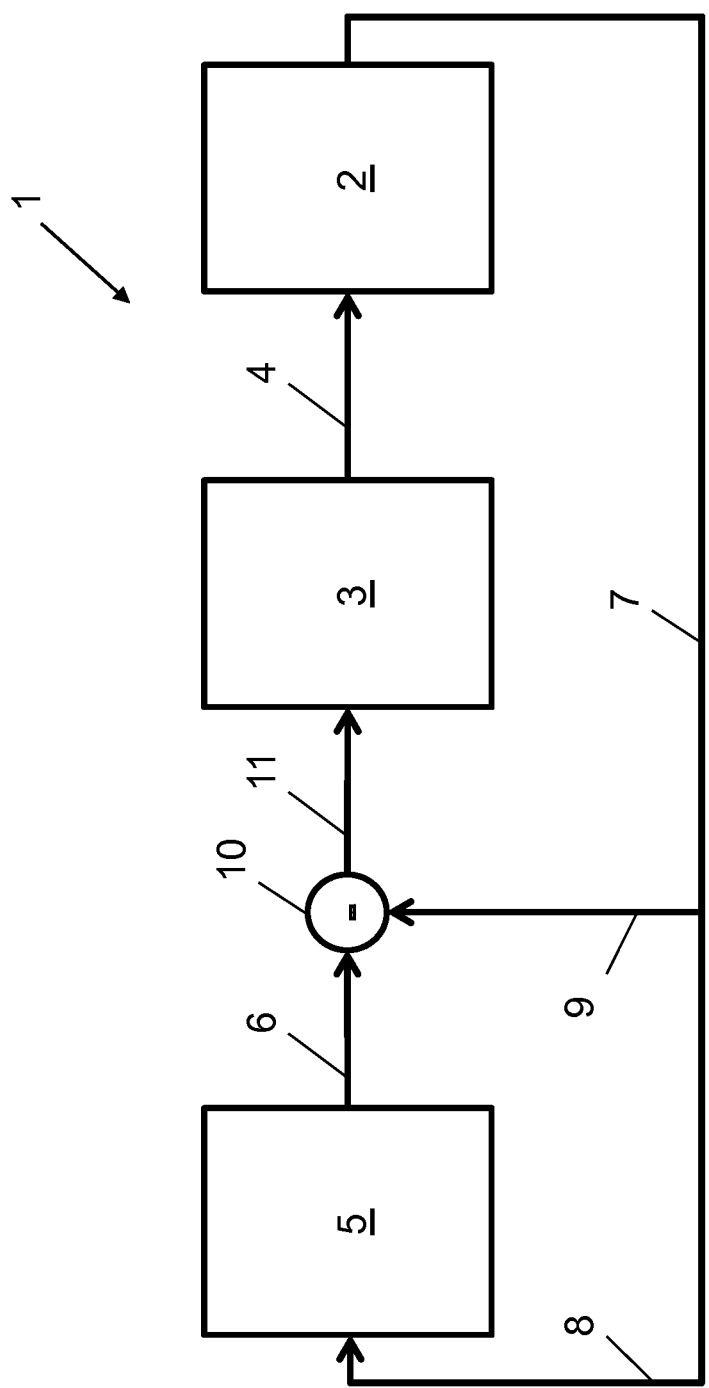
FIG. 1 is a schematic view of a device for controlling an electrically power-assisted steering device for vehicles according to the prior art.

FIG. 1 illustrates a schematic view of a device 1 for controlling an electrically power-assisted steering device (EPAS) 2 for vehicles, in particular motor vehicles, according to the prior art. The device 1 includes a control unit 3 for making available control information 4 and a setpoint signal value transmitter 5 for making available setpoint value information 6. The steering device 2 makes available actual value information 7, including for example steering angle information, steering angle speed information, steering angle acceleration information and actual torque information of a steering column (not illustrated in more detail in FIG. 1) of the steering device 2. The actual value information can be transmitted on what is referred to as a vehicle bus, for example a serial bus, or can be transmitted on respectively separate transmission lines. The steering angle information and the torque information is detected by means of corresponding steering angle sensors or torque sensors (not illustrated either in FIG. 1), for example on the steering column of the steering device 2.

The actual value information 7 is fed into the setpoint signal value transmitter 5 in a first branch 8, and to a subtraction point 10 in a second branch 9. At the subtraction point 10, difference value information 11 is calculated by forming different values from the setpoint value information 6 and the actual value information 7 transmitted in the branch 9, with the difference value information 11 subsequently fed into the control unit 3. In particular, the setpoint value information 6 includes a setpoint torque information item of the steering column of the steering device 2 that the driver of the vehicle is to perceive, and the actual value information 7 that is transmitted in the branch 9 includes at least one actual torque information item of the steering column that the driver actually perceives. The difference value information 11 fed into the control unit 3 constitutes a deviation of at least the actual torque from the setpoint torque of the steering column of the steering device 2. The control unit 2, which can be, for example, a PID control unit, generates, from this deviation, the control information 4 for an electric motor (not illustrated in FIG. 1) that provides power assistance for the steering device 2, for example a control signal for the assistance torque which is to be output by the electric motor.

In the branch 8, at least the part of the actual value information 7 that includes the steering angle information, the steering angle speed information and the steering angle acceleration information is fed into the setpoint signal value transmitter 5. The latter first generates and then feeds the setpoint value information 6 into the subtraction point 10. In the case of the device 1 according to the prior art illustrated in FIG. 1, the control unit 3 will compensate for any type of feedback in the actual value information 7, whether the feedback is about the primary driving state of the vehicle or feedback about adverse effects from the road, and interpret the feedback as noise of the actual value information. Therefore, the device 1 does not, in particular, permit any sufficient feedback about the primary driving state of the vehicle to the driver of the vehicle via the steering device 2. Accordingly the driver perceives the steering sensation of the steering device 2 as being synthetic.

Figure 2:
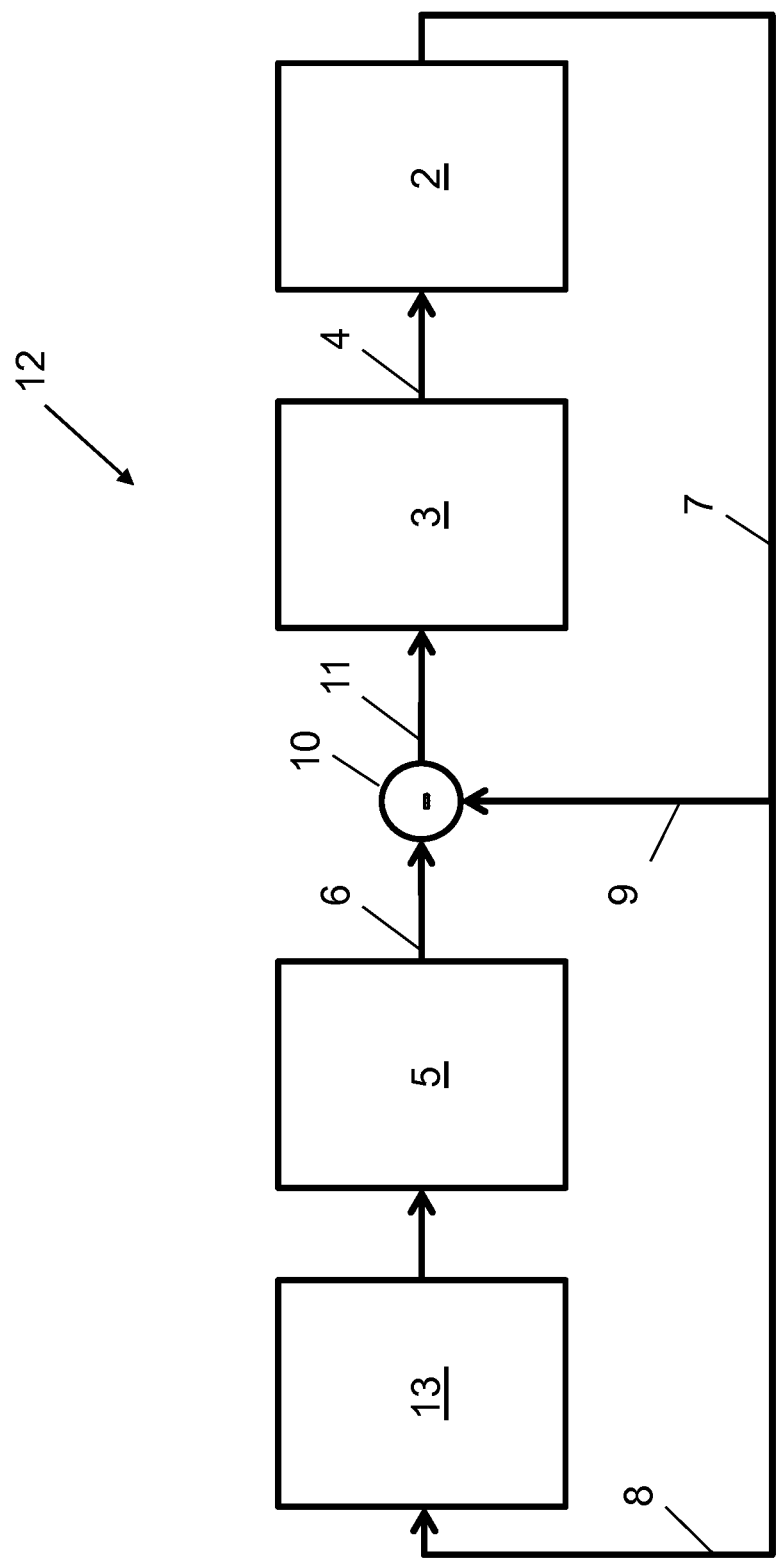
FIG. 2 is a schematic view of a device according to one embodiment of the invention for controlling an electrically power-assisted steering device for vehicles.

In contrast, FIG. 2 illustrates a schematic view of an exemplary embodiment of a device 12 for controlling an electrically power-assisted steering device (EPAS) 2 for vehicles, in particular motor vehicles, according to the present invention. The device 12 includes a filter unit 13 connected upstream of the setpoint signal value transmitter 5. As illustrated in FIG. 2, the actual value information transmitted in the branch 8 is said first to the filter unit 13 before being passed on in a filtered form to the setpoint signal value transmitter 5. The filter unit 13 may include a separate Butterworth filter used to filter information, such as, for example, steering angle information, steering angle speed information and steering angle acceleration information. The Butterworth filter filters out the type and quantity of information components determined by the parameters of the respective Butterworth filters from the actual value information 8, with the result that the latter are no longer fed to the setpoint signal value transmitter 5. During the formation of difference values from the setpoint value information 6 and the actual value information 9, made available by the steering device 2 and which still includes all the original information components, the difference value information 11 continues to contain precisely those information components which were gated out from the setpoint value information 6. The information components, which are the same both in the setpoint value information 6 and in the actual value information 9 made available, are deleted from the difference value information 11 by the formation of difference values. Consequently, the active, dynamic control unit 3 does not receive any information about the information components which were gated out from the difference value information 11, with the result being that said components cannot be compensated by the control unit 3 or interpreted by the control unit 3 as noise. What is not compensated for by the control unit 3 can be perceived by the driver in the type and quantity which are desired and can be determined by the filter unit 13, via the steering device 2. The device 12 has, compared to the device 1 illustrated in FIG. 1, a steering sensation which can be perceived in a significantly realistic way by the driver, in particular with respect to the primary driving state of the vehicle. Furthermore, this improvement is obtained by connecting the filter unit 13 upstream of the setpoint signal value transmitter 5.

A further aspect or example of the present invention includes a method for controlling an electrically power-assisted steering device for vehicles. The device described above for controlling an electrically power-assisted steering device for vehicles is not limited to the embodiment disclosed herein but rather also includes further embodiments which act in the same way. In particular, for example, the invention contemplates interchanging the sequence of the filter unit 13 and the setpoint signal value transmitter 5 illustrated in FIG. 2. Furthermore, in addition to or instead of the filter unit 13 shown in FIG. 2 it is possible to provide a filter unit for filtering the difference value information 11 fed into the control unit 3. Likewise, a filter unit could be provided downstream of the steering device 2 for filtering the actual value information 11 is made available by the latter, and the filter unit could be provided alone or in addition to one of the previously mentioned filter units.

Furthermore, the control method and the control device are not restricted to the application shown herein on an electrically power-assisted steering device. Instead, the control method and the control device can generally be applied to any comparable mechatronic force or torque feedback system. For example, for this purpose the steering device 2 in FIG. 2 could be replaced by the respective mechatronic force or torque feedback system.

In addition, the filter unit 13 is not restricted to the Butterworth filter described herein but instead also includes, depending on the desired filter properties, other suitable types of low-pass, high-pass or bandpass filters which are known insofar as these are able to filter out the suitable type and quantity of the desired information components from the information. In this context, the filter unit can be separated into individual information items of the steering device, such as, for example, the steering angle, the steering angle speed, the steering angle acceleration and may include information relating to the vehicle, such as, for example, the vehicle speed, the yaw rate and/or the lateral acceleration, and optionally applied to any information item or globally, with different filter parameters. Furthermore, a plurality of filter units can also be provided for filtering the information, wherein the type and quantity of the information components filtered out from the information are determined by the respective filter, as is the parameterization thereof.

In one preferred embodiment, the method according to the invention and the device according to the invention are each used to control an electrically power-assisted steering device for vehicles, in particular motor vehicles.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a power-assisted steering device comprising the steps of:
   providing control information from dynamic control unit;
   feeding the control information to the steering device;
   providing a setpoint signal value transmitter;
   providing actual value information from the steering device to a filter unit;
   using the filter unit to filter out an information component from the actual value information received from the steering device and generate filtered information;
   feeding the filtered information to the setpoint signal value transmitter and using the setpoint signal value transmitter to generate setpoint value information;
   forming difference value information from the setpoint value information and the actual value information, wherein said difference value information includes the information component filtered from the actual value information; and
   feeding the difference value information to the control unit.

2. The method as set forth in claim 1 wherein the filtered out information component includes at least one of the following: steering angle information, steering angle speed information, and steering angle acceleration information.

3. The method set forth in claim 1 wherein step of filtering out an information component includes using a Butterworth filter.

4. The method as set forth in claim 1 wherein step of filtering out an information components includes filtering out more than one information component; and
   using a separate filter to filter out each information component.

5. The method as set forth in claim 1 wherein the control information is provided by a PID control unit.

6. An apparatus for controlling a power-assisted steering device comprising:
   a control unit providing control information;

a setpoint signal value transmitter providing setpoint value information;

a steering system providing actual value information;

control circuitry operative to develop a difference value information from the setpoint value information and actual value information and transmit said difference value information to said control unit, said difference value information containing the predetermined information component filtered by said filter unit; and a filter unit, said filter unit operative to filter out a predetermined information component.

7. An apparatus as set forth in claim 6 wherein said filter unit filters out a predetermined information component from said actual value information.

8. An apparatus as set forth in claim 6 wherein said filter unit filters out a predetermined information component from the actual value information received by the setpoint signal value transmitter.

9. An apparatus as set forth in claim 6 wherein said filter unit filters out a predetermined information component from the setpoint value information.

10. An apparatus as set forth in claim 6 wherein said filter unit filters out a predetermined information component from the difference value information.

11. An apparatus as set forth in claim 6 wherein the filter unit filters out and information component that includes at least one of the following: steering angle information, steering angle speed information, and steering angle acceleration information.

12. An apparatus as set forth in claim 6 wherein the filter unit includes at least one Butterworth filter.

13. An apparatus as set forth in claim 6 including a separate filter unit for information component.

14. An apparatus as set forth in claim 6 wherein the control unit is a PID control unit.

* * * * *